(12) United States Patent
Aleksic

(10) Patent No.: US 7,861,007 B2
(45) Date of Patent: Dec. 28, 2010

(54) METHOD AND APPARATUS FOR MULTIMEDIA DISPLAY IN A MOBILE DEVICE

(75) Inventor: Milivoje Aleksic, Richmond Hill, Ontario (CA)

(73) Assignee: ATI Technologies ULC, Markham, Ontario (CA)

( * ) Notice: Subject to any disclaimer, the term of this patent is extended or adjusted under 35 U.S.C. 154(b) by 2048 days.

(21) Appl. No.: 10/729,218

(22) Filed: Dec. 5, 2003

(65) Prior Publication Data

US 2005/0125733 A1 Jun. 9, 2005

(51) Int. Cl.
G06F 3/00 (2006.01)
(52) U.S. Cl. .............................. 710/5; 710/62
(58) Field of Classification Search .................. None
See application file for complete search history.

(56) References Cited

U.S. PATENT DOCUMENTS

| | | | |
|---|---|---|---|
| 2,360,969 A | 10/1944 | Newcombe | |
| 3,052,106 A | 9/1962 | Sampietro | |
| 3,500,656 A | 3/1970 | Lofgreen et al. | |
| 3,817,055 A | 6/1974 | Hosokawa | |
| 4,262,495 A | 4/1981 | Gupta et al. | |
| 4,334,411 A | 6/1982 | Payne | |
| 4,345,440 A | 8/1982 | Allen et al. | |
| 4,350,019 A | 9/1982 | Chocas | |
| 4,422,301 A | 12/1983 | Watt et al. | |
| 5,186,013 A | 2/1993 | Durso | |
| 5,524,442 A | 6/1996 | Bergman, Jr. et al. | |
| 6,377,261 B1 | 4/2002 | Fernandez et al. | |
| 6,825,780 B2 | 11/2004 | Saunders et al. | |
| 6,876,379 B1 * | 4/2005 | Fisher | 348/14.02 |
| 7,027,056 B2 * | 4/2006 | Koselj et al. | 345/519 |
| 7,436,329 B2 | 10/2008 | Lynch et al. | |
| 7,525,463 B2 | 4/2009 | Saunders et al. | |
| 2003/0117585 A1 * | 6/2003 | Lee | 352/244 |
| 2003/0198395 A1 | 10/2003 | Lynch et al. | |

(Continued)

OTHER PUBLICATIONS

Pang et al., A Portable Multimedia Information Device in a Wireless Optical Data Link, May 16, 2000, IEEE, pp. 1-9.*
McChesney et al., Optimization of an Adaptive Link Control Protocol for Multimedia Packet Radio Networks, May 2009, IEEE, pp. 1-5.*
Search Report for PCT/IB/2004/004018 issued on Jun. 2, 2006.
International Search Report for International Application No. PCT/US09/45560, Jul. 23, 2009, 2 pp.
Written Opinion for International Application No. PCT/US09/45560, Jul. 23, 2009, 5 pp.

*Primary Examiner*—Eron J Sorrell
(74) *Attorney, Agent, or Firm*—Vedder Price P.C.

(57) ABSTRACT

The present invention provides for a method and apparatus for multimedia display in a mobile device including a multimedia processor capable of generating a multimedia display output. The method and apparatus further includes a multimedia display buffer and a camera interface coupled to the multimedia processor, wherein the multimedia processor is capable of receiving a captured image from a camera. The method and apparatus further includes a multimedia device interface that is capable of receiving an encoded multimedia display command encoded in a multimedia device interface command protocol. Thereupon, the encoded multimedia display command is generated, such that the multi-media processor can generate the multimedia display output and provide the multimedia display output to the display device.

28 Claims, 6 Drawing Sheets

U.S. PATENT DOCUMENTS

| | | |
|---|---|---|
| 2003/0206597 A1 | 11/2003 | Kolarov et al. |
| 2003/0229773 A1 | 12/2003 | Lynch et al. |
| 2003/0235340 A1 | 12/2003 | Saunders et al. |
| 2004/0068642 A1* | 4/2004 | Tanaka et al. ............... 712/223 |
| 2005/0104752 A1 | 5/2005 | Saunders et al. |
| 2005/0105609 A1 | 5/2005 | Lynch et al. |
| 2006/0071827 A1 | 4/2006 | Lynch et al. |
| 2006/0072834 A1 | 4/2006 | Lynch et al. |
| 2006/0218482 A1* | 9/2006 | Ralston et al. ............ 715/500.1 |
| 2007/0095079 A1 | 5/2007 | Sterling |

* cited by examiner

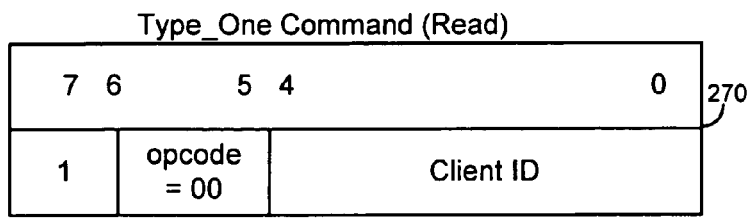
FIG. 11
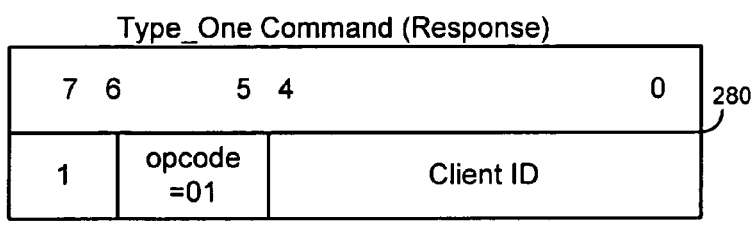
FIG. 12
| Client ID | Starting Address [33:10] | Transaction Length [9:1] | AI |
|---|---|---|---|
| 000 | | | |
| 001 | | | |
| ⋮ | ⋮ | ⋮ | ⋮ |
| 111 | | | |
FIG. 13

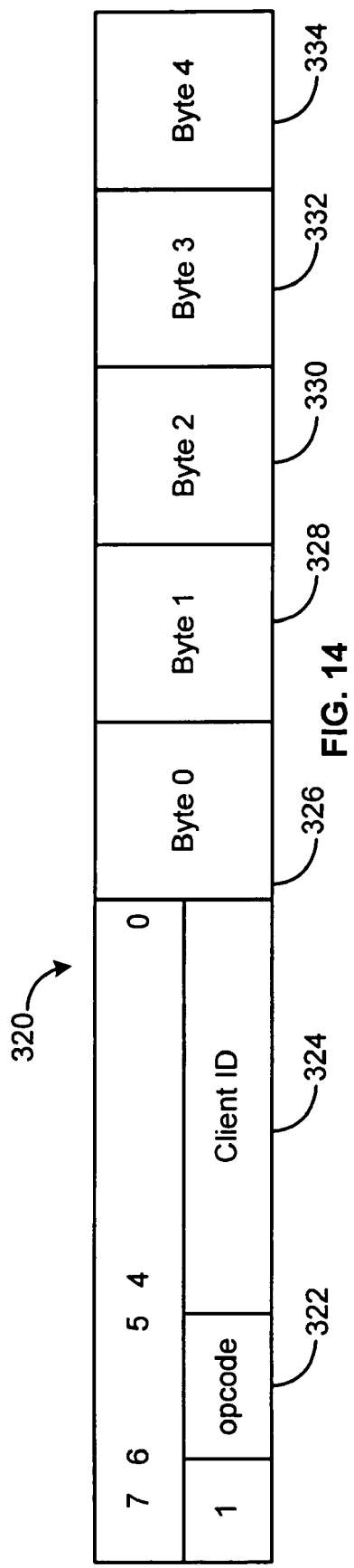

METHOD AND APPARATUS FOR MULTIMEDIA DISPLAY IN A MOBILE DEVICE

FIELD OF THE INVENTION

The present invention relates generally to a multimedia display device and more specifically to providing a multimedia display in a mobile device.

BACKGROUND OF THE INVENTION

With the growth of modern computing trends, there is an increased demand in portability and improved functionality of a mobile device, wherein a mobile device may be, but not limited to, a cellular phone, a personal digital assistant (PDA), a pager, a smart phone, or any other suitable portable electronic device capable of providing graphical interactivity, as recognized by one having ordinary skill in the art. Furthermore, with the convergence of mobile devices having improved functionality and stand-alone computing systems, such as a desktop or laptop computer, having greater interactivity with the mobile device, there is a greater demand for improved functionality and quality of interactivity between multiple mobile devices and also interactivity between the mobile device and the stand-alone computing system.

An emerging area in mobile devices is the ability to acquire, render and transmit graphical and/or video images. One example of convergence of multiple technologies is the placement of cameras on mobile devices. Another example is the development of interactive video games to be played on the mobile device. With these graphic intensive applications, there exist prior art limitations with regard to graphical architecture for generating the graphical output. One common problem in the mobile device is the limited power and memory resources. Current graphics rendering techniques, including three-dimensional graphics rendering techniques, require an extensive amount of power to perform the various and multiple steps in a graphics-processing pipeline. Furthermore, three-dimensional graphics rendering may also be memory intensive due to memory requirements for storing, among other things, vertex information, pixel information, and/or texture data. In modern mobile devices, due to size requirements and power requirements, there is an extremely limited amount of available space for providing memory resources and power consumption constraints severely restrict graphics rendering while maintaining an extended mobile device battery life.

Another specific limitation found within current mobile devices is limited physical real-estate for placing graphics rendering engines and also limited bandwidth availability for processing the graphics rendering data. As mobile devices become more compact, there exists less real-estate for the insertion of additional processors for performing the graphics processing operations, such as two-dimensional or three-dimensional rendering. Furthermore, the available bandwidth for transmitting the graphics rendering data is also limited. Among other things, size constraints prohibit a large data bus for graphics rendering information and therefore can severely restrict the processing speed and/or quality of a graphics rendering engine.

Therefore, a need exists for a method and apparatus that overcomes power consumption requirements, limited memory resources, limited bandwidth availability within the mobile device and provides for graphics rendering effectively using the limited available real-estate within the mobile device.

BRIEF DESCRIPTION OF THE DRAWINGS

FIG. 11 illustrates a graphical representation of a command, in accordance with one embodiment of the present invention;

FIG. 12 illustrates a graphical representation of a command, in accordance with one embodiment of the present invention;

FIG. 13 illustrates a graphical representation of a lookup table, in accordance with one embodiment of the present invention; and FIG. 14 illustrates a graphical representation of an entry field for programming an entry in the lookup table of FIG. 13, in accordance with one embodiment of the present invention.

DETAILED DESCRIPTION OF A PREFERRED EMBODIMENT

Generally, the present invention provides for a method and apparatus for multimedia display in a mobile device. The method and apparatus includes a multimedia processor capable of generating a multimedia display output, wherein the multimedia display output may be any suitable output signal capable of being received by a display device. The method and apparatus further includes a multimedia display buffer coupled to the multimedia processor.

A camera interface is further coupled to the multimedia processor such that the multimedia processor is capable of receiving a captured image from a camera. The captured image may be an encoded image signal acquired by the camera, wherein the camera may be, in one embodiment, a typical camera found in existing mobile devices.

The method and apparatus further includes a multimedia link interface (MLINK) that is capable of receiving an encoded multimedia display command. The multimedia display command is encoded in a multimedia link interface command protocol, as discussed in greater detail below, wherein the multimedia link interface command protocol is a protocol allowing for reduced data transmission fields.

The method and apparatus further includes generating from the encoded multimedia display command, a multimedia display command capable of being performed by the multimedia processor, such that the multimedia processor can generate the multimedia display output and provide the multimedia display output to the display device. The method and apparatus improves multimedia display in a mobile device by using the encoded multimedia display command in conjunction with the above-noted elements using the multimedia device interface command protocol.

Figure 1:
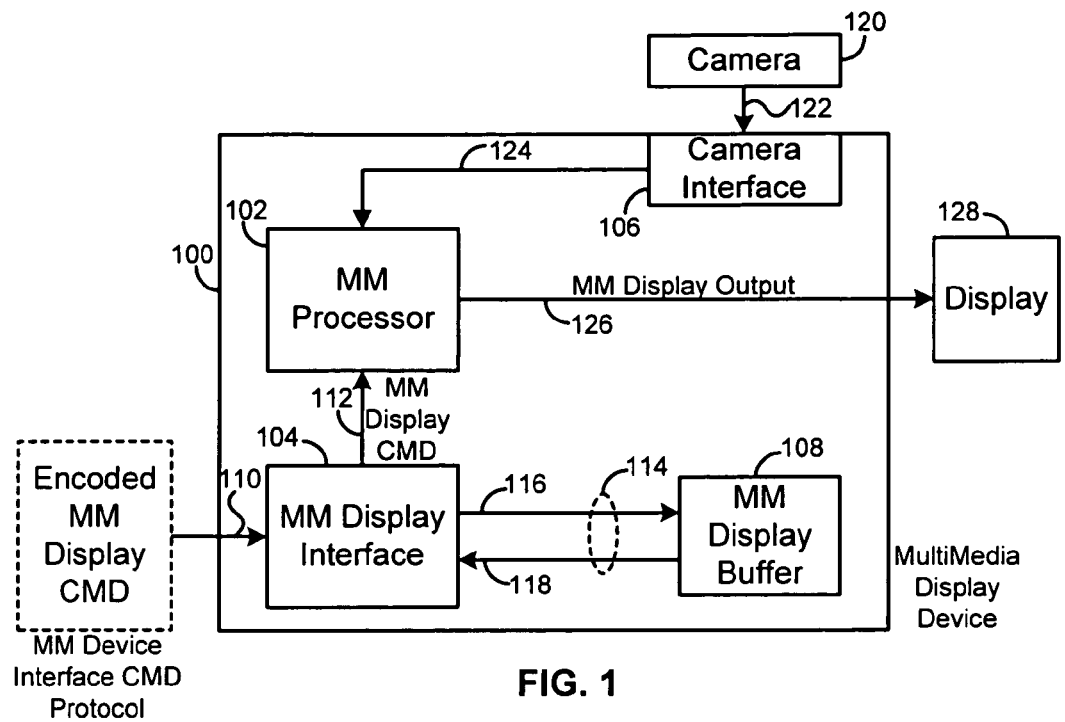
FIG. 1 illustrates a functional block diagram of an apparatus for multimedia display in a mobile device, in accordance with one embodiment of the present invention.

More specifically, FIG. 1 illustrates a multimedia display device 100 having a multimedia processor 102, a multimedia interface 104, a camera interface 106 and a multimedia display buffer 108. The multimedia display device 100 receives an encoded multimedia display command 110, which is encoded within a multimedia link interface command protocol. The multimedia display interface 104 provides a multimedia display command 112 to the multimedia processor 102.

The multimedia display interface 104 is coupled to the multimedia display buffer 108 across a bus 114. In one embodiment, the multimedia display interface MMD 104 provides an encoded command 116 to the multimedia display buffer 108 and a decoded command 118 is provided.

The multimedia display device 100 is further operably coupled to a camera 120, wherein the camera provides an acquired image 122 to the camera interface 106. The camera interface 106 provides a captured image 124 to the multimedia processor 102.

Thereupon, the multimedia processor 102, in response to the multimedia display command 112, generates a multimedia display output 126. The multimedia display output 126 is provided to a display device 128.

In one embodiment, the multimedia processor 102 may be, but not limited to, a single processor, a plurality of processors, a DSP, a microprocessor, ASIC, state machine, or any other implementation capable of processing and executing software or discrete logic or any suitable combination of hardware, software and/or firmware. The term processor should not be construed to refer exclusively to hardware capable of executing software, and may implicitly include DSP hardware, ROM for storing software, RAM, and any other volatile or non-volatile storage medium.

Furthermore, the multimedia display buffer 108 may be, but not limited to, a single memory, a plurality of memory locations, shared memory, CD, DVD, ROM, RAM, EEPROM, optical storage, or any other non-volatile storage capable of storing digital data for use by the processor 102.

In one embodiment, the multimedia processor 102 includes the ability to perform audio encoding and decoding, such as MPEG encoding and/or decoding and JPEG encoding for still images. Furthermore, the multimedia processor 102 may further include a frame buffer (not illustrated) capable of storing encoded visual graphics data.

Figure 2:
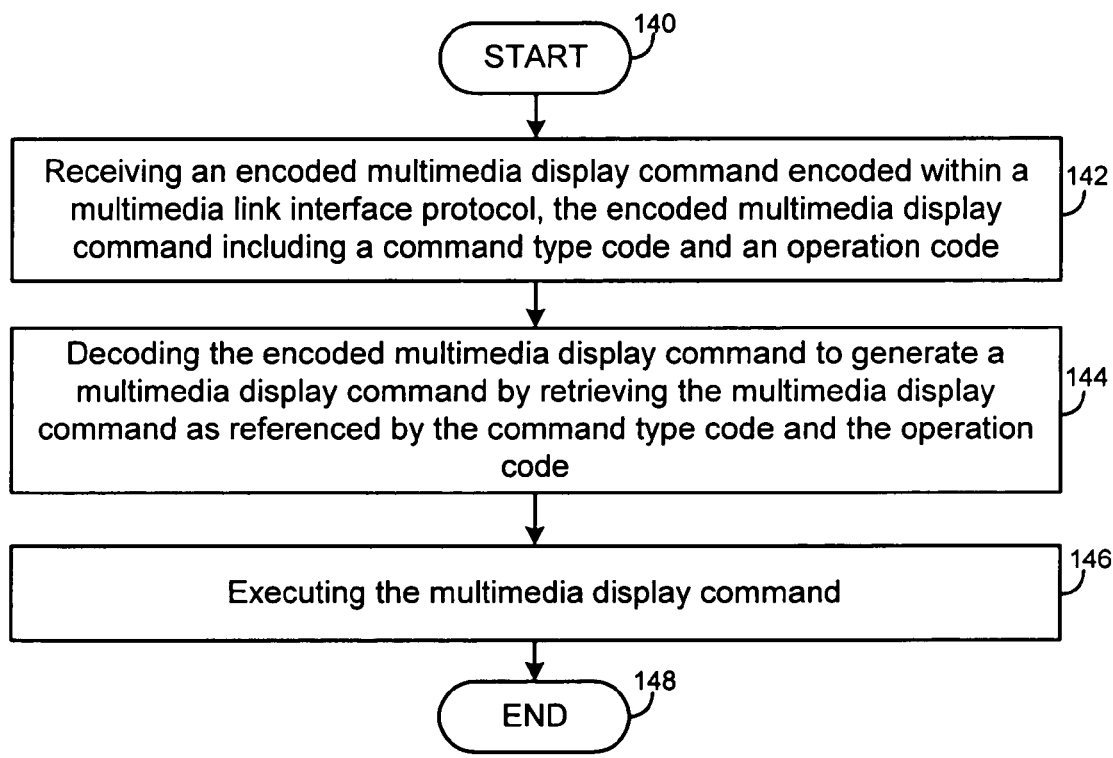
FIG. 2 illustrates a flow chart of steps of a method for multimedia display in a mobile device, in accordance with one embodiment of the present invention.

In accordance with one embodiment of the present invention, FIG. 2 illustrates the steps of one method for multimedia display in a mobile device. The method begins, step 140, by receiving an encoded multimedia display command encoded within a multimedia link interface protocol, the encoded multimedia display command including a command type code and an operation code, step 142. As discussed above with regard to FIG. 1, the encoded multimedia display command 110 is provided to the multimedia display interface 104.

The next step, step 144, includes decoding the encoded multimedia display command to generate a multimedia display command by retrieving the multimedia display command as referenced by the command type code and the operation code. As discussed below, the command type and the operation code provide for reduced power and memory consumption and a reduction in bandwidth requirements. Furthermore, as discussed above, the multimedia display interface 104, in one embodiment, may perform the decoding of the encoded multimedia display command 110 to generate the multimedia display command 112. Thereupon, the next step in the method, step 146, is executing the multimedia display command 112. The multimedia display command 112, in one embodiment, is executed by the multimedia processor 102 operating in response to the command instructions. Thereupon, the method is complete, step 148.

Figure 3:
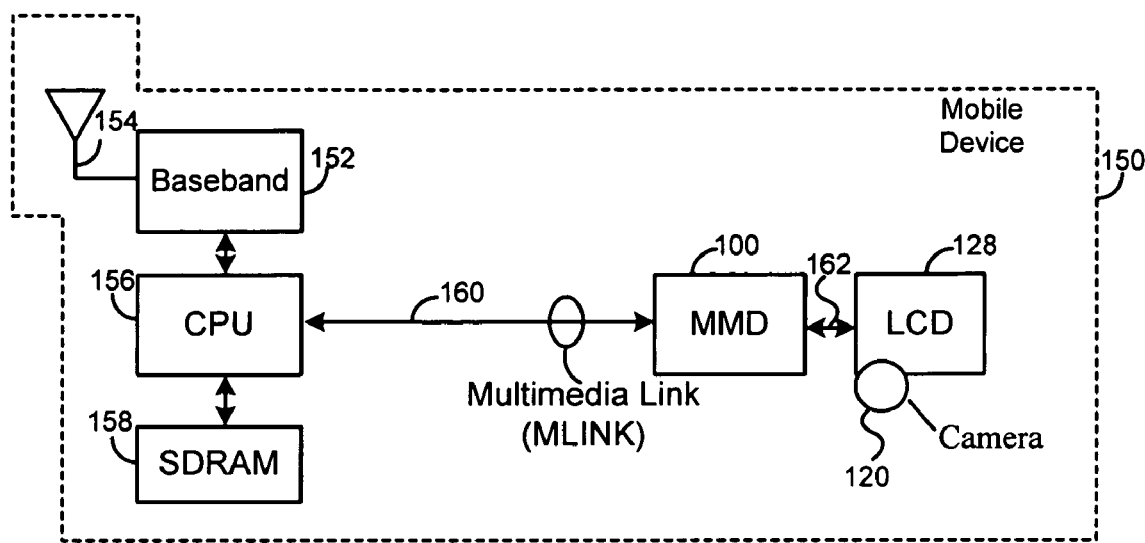
FIG. 3 illustrates a functional block diagram of a mobile device, in accordance with one embodiment of the present invention.

FIG. 3 illustrates a mobile device 150, in accordance with one embodiment of the present invention. The mobile device 150 includes a base band receiver 152 operably coupled to an antenna 154. The base band receiver 152 is further coupled to a central processing unit (CPU) 156. In one embodiment, the CPU is further coupled to a memory device, such as an SDRAM. As recognized by one having ordinary skill in the art, the elements 152, 154, 156 and 158 may operate in accordance with known mobile device operation techniques.

Further included within the mobile device 150 of the present invention is the multimedia display device 100 coupled to the CPU 156 across a multimedia link (MLINK) 160. The MLINK 160 may be one or more uni-directional busses capable of transmitting information thereacross using an MLINK interface, as discussed below. The multimedia device 100 is further coupled to the display device 128 included in the mobile device 150. Further illustrated in the embodiment of FIG. 3, the camera 120 is disposed relative to the LCD 128. Wherein, a bus 162 provides for communication of captured image data, illustrated in FIG. 1 as acquired image 122, back to the multimedia device 100. Moreover, as recognized by one having ordinary skill in the art, many elements within the mobile device 150 of FIG. 3 have been omitted for clarity purposes only.

Figure 4:
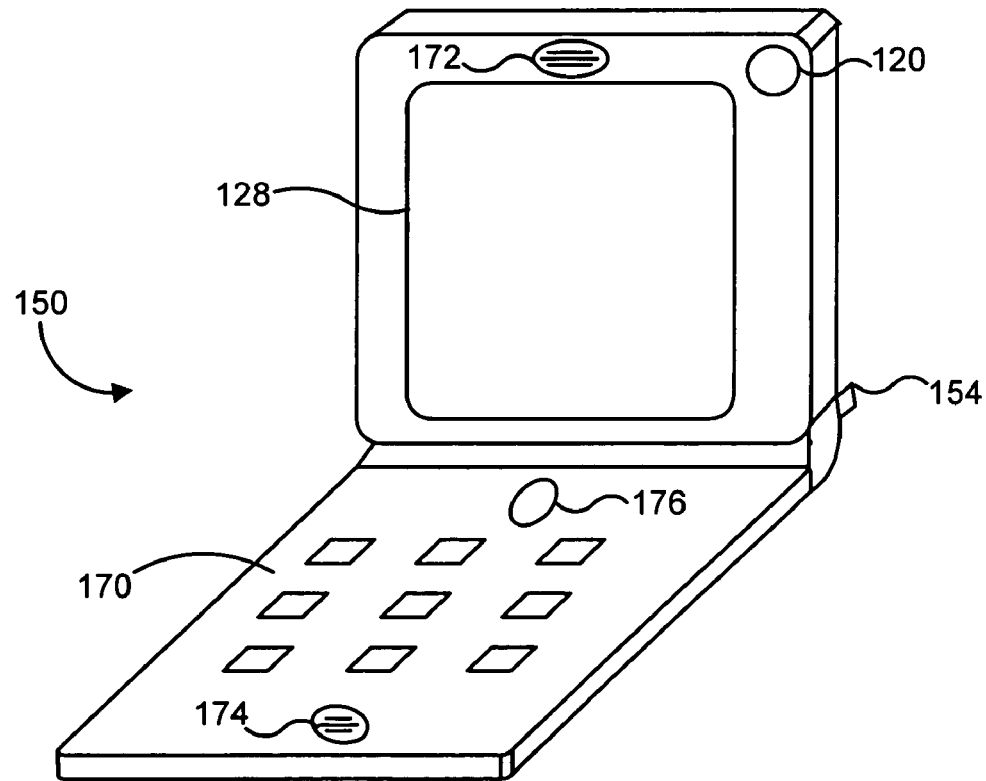
FIG. 4 illustrates a graphical representation of a mobile device, in accordance with one embodiment of the present invention.

FIG. 4 illustrates a graphical representation of the mobile device 150, a "clam" style cellular telephone. The mobile device 150 includes a keypad 170, a speaker 172, a microphone 174, a navigational pad 176, and a display 128. Further included within the mobile device 150 are processing elements, not visible, such as the base band receiver 152, CPU 156, memory 158, multimedia device 100 illustrated in FIG. 3. Furthermore, partially visible is the antenna 154 typically disposed on a backside of the mobile device 150. As recognized by one having ordinary skill in the art, the mobile device 150 allowing for multimedia display in accordance with the descriptions above and below may be any suitable mobile device providing for operation of the present invention, wherein the "clam-style" cellular telephone is for exemplary purposes only.

Figure 5:
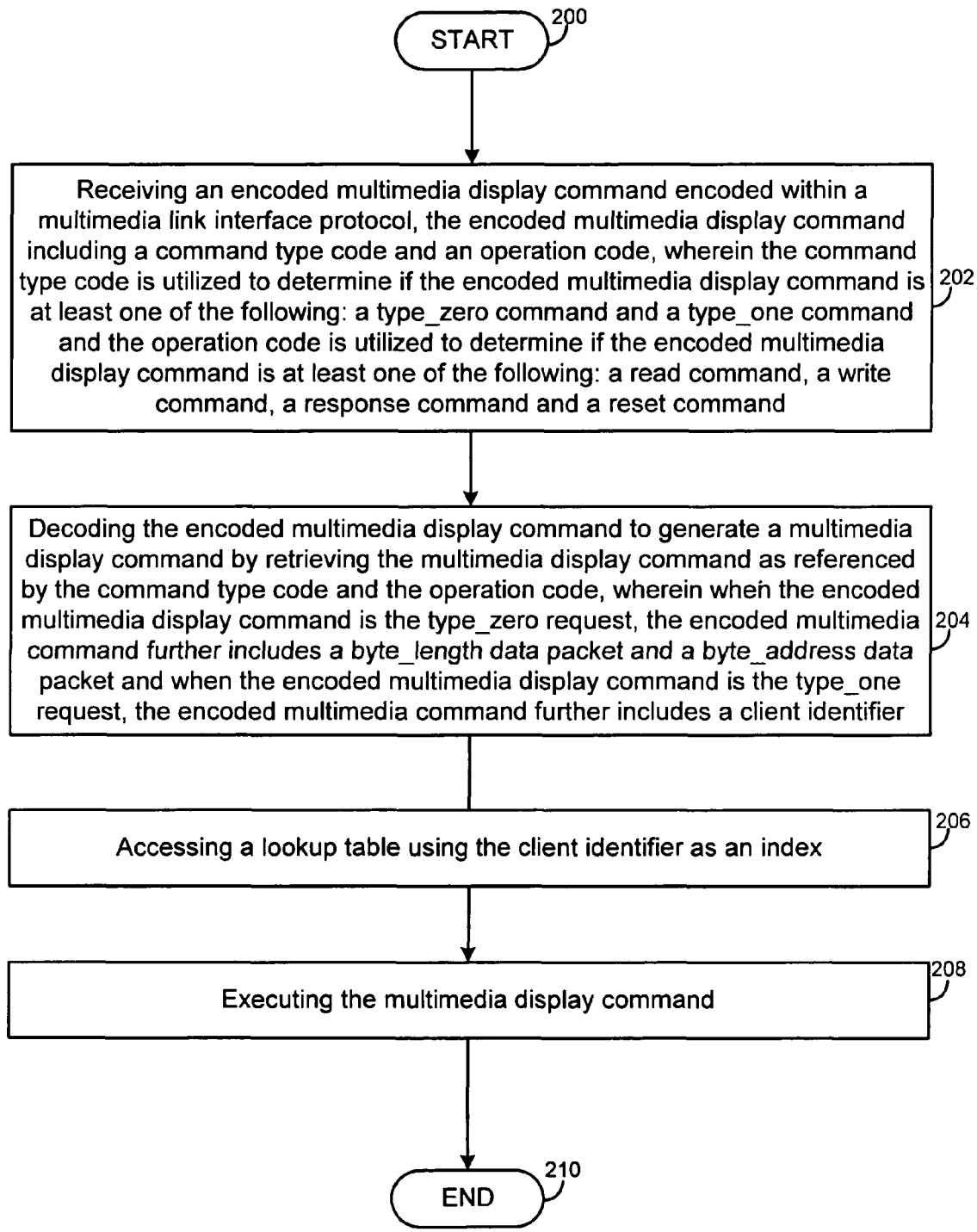
FIG. 5 illustrates a flow chart of steps of a method for multimedia display in a mobile device, in accordance with one embodiment of the present invention.

FIG. 5 illustrates a flowchart of steps for a method for multimedia display in a mobile device, such as the mobile device 150 described above. Within mobile device 150, the MMD 104 utilizes a packet based communication protocol based on split transactions. In one embodiment, every packet is a minimum length of four bytes and the maximum length of 64 bytes, but as recognized by one having ordinary skill in the art, the minimum length and the maximum length of the packet may be any other suitable size, dependent upon factors such as but not limited to bus size and processing requirements. Specifically, there are two types of packets within the communication protocol, a request packet and a response packet.

With regard to the method of FIG. 5, the method begins, step 200, by receiving an encoded multimedia display command encoded with a multimedia link interface protocol, the encoded multimedia display command including a command type code and an operation code, wherein the command type code is utilized to determine if the encoded multimedia display command is at least one of the following: a type_zero command and a type_one command and the operation code is utilized to determine if the encoded multimedia display command is at least one of the following: a read command, a write command, a response command a reset command, step 202.

The MLINK allows a multimedia capable device to use low power through the generation of fewer signals, it is a low cost alternative with an easily integrated application placed into a digital CMOS chip, provides a point-to-point interface utilizes a straight forward and simple MLINK protocol. As described above, the MLINK is a dedicated unidirectional point-to-point low pin count interface between a host, such as the processor 156 and the multimedia device 100.

In one embodiment, there are two primary MLINK usage models for multimedia capable device allowing for data initiation and data flow. A first MLINK usage model is a master/slave model, wherein the primary multimedia memory is local memory associated with the multimedia device 100. Multimedia structures which are stored in system memory, such as the SDRAM 158 of FIG. 3, must be copied to the local memory, to which the multimedia device 100 may therein reference. In video encoding paths, encoded data is read by the master and copied to the system memory. Therefore, traffic on the MLINK 160 may be long and sequential transfers allowing for bulk data transport from system memory to local frame memory or vice versa.

In one embodiment, the MLINK 160 utilizes a physical protocol consisting of a plurality of inputs and outputs. In the master/slave model, one embodiment includes a master clock (MCLK) for synchronizing data from the master device, master data (MDATA) provided to the slave device and a master frame signal (mFRAMEb). The master data may be configured to have any available width, such as but not limited to, 1, 2, 4 or 8 bits. The mFRAMEb signal may be included as the data signal transmitted between the master and the slave. In this embodiment, the mFRAMEb signal indicates to the slave that a new packet of data transmission has begun. The slave samples this signal a rising edge of a master clock signal, wherein the master frame signal will be asserted for a predetermined number of clock cycles at the beginning of each data packet transmission, wherein the number of clock cycles is dependent upon the data packet width.

In this embodiment, the MLINK 160 physical protocols further include a slave clock signal (SCLK), a slave data signal (SDATA) and a slave frame signal (sFRAMEb). The sFRAMEb signal indicates to the master that a new packet has begun. The master device samples this signal on the rising edge of a slave clock and the slave frame signal is asserted for a predetermined number of clock cycles at the beginning of each data packet, wherein the number of clock cycles depends on the length of the data packet.

In one embodiment, the MLINK 160 further includes a slave based active low asynchronous interrupt request from slave device to master device signal (INTB) and a master active low hard reset signal (Resetb).

Referring back to the frame signal, the frame signals (mFRAMEb, sFRAMEb) are asserted at the beginning of a new packet to indicate the start of new data transmission. The receiving side has to decode the operational code when this signal is asserted to check what the new packet is going to receive. Since the data width is configurable, the number of clock cycles for these signals may be different. For example, in one embodiment, if the data width is 1 bit, the frame signal has a width of 4 clock cycles. In another embodiment, if the data width is 2 bits, the frame signal width is 2 clock cycles, if the data width is 4 or 8 bits wide, the frame signal width is 1 clock cycle.

Figure 6:
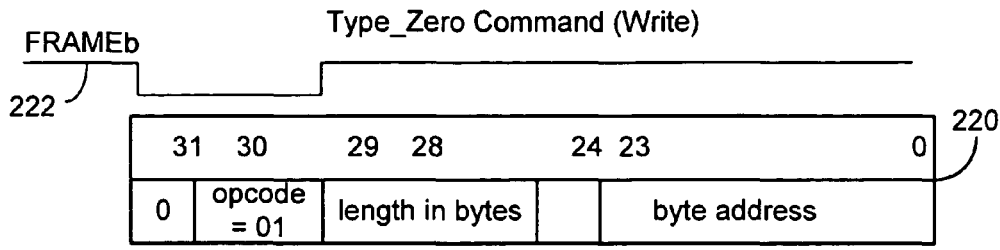
FIG. 6 illustrates a graphical representation of a command, in accordance with one embodiment of the present invention.

FIGS. 6-12 illustrate various types of commands in accordance with one embodiment of the present invention. FIG. 6 illustrates a type_zero write command 220 having a length of 32 bits including an operation code 01, which in accordance with one embodiment of the present invention, provides an instruction to write to a specific address defined by a byte address as listed in bits 0 through 23 of the command 220. The command further includes a most significant bit being a "0", indicating a type zero request is being transmitted. The next two bits represent the operation code, which determines whether the request is for a read or write operation.

In one embodiment of the present invention, the operation codes may be "00" providing for reading a number of bits from a designated byte address, "01" providing for writing a designated number of bits to a specific byte address, "10" indicating a response operation and "11" indicating a configuration access relative to a type_one command.

Figure 7:
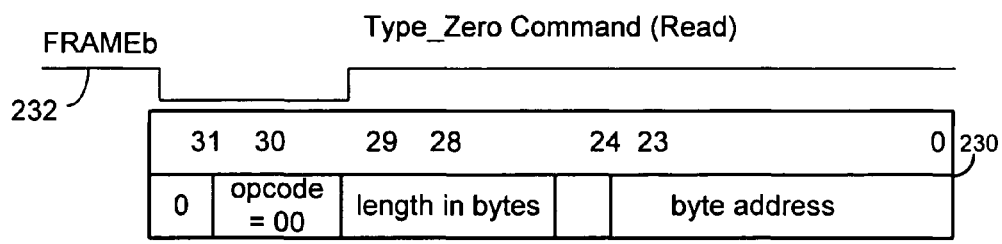
FIG. 7 illustrates a graphical representation of a command, in accordance with one embodiment of the present invention.
Figure 8:
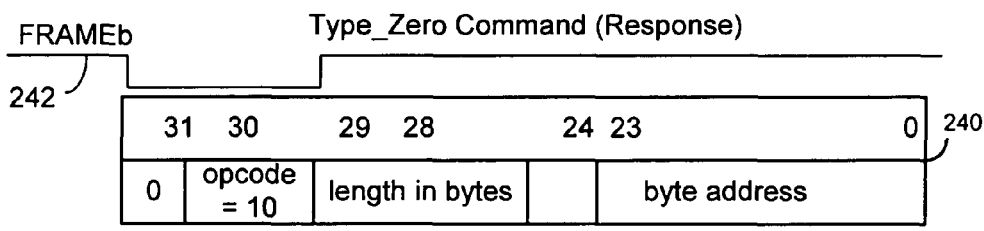
FIG. 8 illustrates a graphical representation of a command, in accordance with one embodiment of the present invention.

FIGS. 6-8 illustrate three different types of type_zero commands, the write command 220, a read type_zero command 230 of FIG. 7 and a type_zero response command 240 of FIG. 8. Consistent with the description of the type_zero command 220, commands 230 and 240 include a most significant bit "0", an operational code, a length in bytes, and a byte address. Bits 25-29 contain the number of bytes to be read/written. There are only five bits for this field because a maximum of 16 bytes can be transmitted by a single request in this embodiment. The bit 24 defines 24/32 address length and the last 24 bits of the byte address, which is the starting address for the read/write operation. In this embodiment, type_zero requests are suited for longer data transfer since each type_zero command consumes at least four bytes of overhead.

Further illustrated in FIGS. 6-8, FRAMEb signals 222, 232 and 242 are illustrated in relation to the command 220, 230 and 240, respectively, wherein the actual width of the active low signal of the FRAMEb signal 222 depends on the data width.

Figure 9:
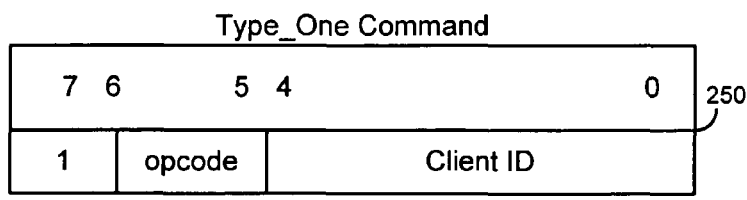
FIG. 9 illustrates a graphical representation of a command, in accordance with one embodiment of the present invention.
Figure 10:
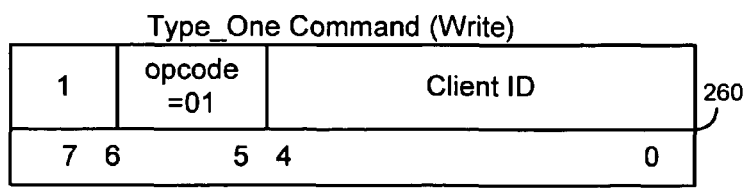
FIG. 10 illustrates a graphical representation of a command, in accordance with one embodiment of the present invention.

FIGS. 9-12 illustrate one embodiment of multiple type_one commands, a request command 250 of FIG. 9, a type_one write command 260 of FIG. 10, a type_one read command 270 of FIG. 11 and a type_one response command 280 of FIG. 12. In accordance with one embodiment of the present invention, the type_one commands 250-280 are eight bits in length including a "1" most significant bit.

FIG. 9 illustrates a general representation of a type_one command 250 having an eight bit length including a most significant bit "1", a two bit operational code, similar to the type_zero commands described above except for the "10" operational code, which is specific to type_one requests only, and a client identifier having a five bit length.

More specifically, FIGS. 10-12 illustrate three specific types of type_one commands; a write type_one command 260 in FIG. 10, a type_one read command 270 of FIG. 11 and a type_one response command 280 of FIG. 12. The commands 260, 270 and 280 include a five bit client ID, wherein the client ID is an index into a lookup table of commonly accessed addresses. As discussed further below with regard to FIG. 13, the type_one command 260, 270 and 280 provide for shorter data transfer and thereby reduce overhead for shorter or common transfers.

Referring back to the method of FIG. 5, the next step, step 204, includes decoding the encoded multimedia display command to generate a multimedia display command by retrieving the multimedia display command as referenced by the command type code and the operation code, wherein the encoded multimedia display command is the type_zero request, the encoded multimedia command further includes a byte_length data packet and a byte_address data packet and when the encoded multimedia display command is the type_one request, the encoded multimedia command further includes a client identifier. As discussed above, the type_zero commands 220, 230 and 240 include the byte_length data packet and the byte_address data packet and the type_one commands 260, 270 and 280 include the client identifier.

When the encoded multimedia display command is a type_one data packet, the next step, step 206, is accessing a lookup table using the client identifier as an index. FIG. 13 illustrates representative embodiment of a lookup table 300 having multiple entries including a client identifier 302, a starting address 304, transaction length 306 and an auto-increment flag (AI) 308. Therefore, in response to a client identifier 302 within a command 250, a starting address 304 may be retrieved and the transaction length 306 may also be retrieved. If the auto-increment flag is set, in one embodiment, the MMD 100 will automatically update the starting address for a client after each transaction request for that client. For example, if client "0" is addressed "X" within the frame buffer, and the associated length is "4", the first time client "0" is accessed, the starting address within the table will be automatically updated to X+4 when the transaction is complete. The second time the client "0" is accessed, the starting address will be X+4 and it will be updated to X+8 upon the completion of the transfer. In order to reset the starting address, the client identifier 302 must be reprogrammed into the table.

The next step, step 208, is executing the multimedia display command. This step may be executed in accordance with known multimedia display command processing technology to thereupon generate the appropriate multimedia output. As such, the method is thereupon complete, step 210.

In the event the operational code for a type_one command is "10", an associated client identifier is to be programmed into the table 300. As discussed above, operational code "10" is reserved for programming the table 300 of type_one client identifiers. Each client identifier can be programmed individually. When the MMD 104 sees an operational code of "10" in a type_one request, in one embodiment, the MMD 104 process the client identifier and treat the next five bytes, without write, latency as the data for the type_one lookup table.

As the master/slave model may be inappropriate for non-contiguous memory space, one embodiment allows for a master/master model. In the master/master model, the MMD 100 uses both the local memory and the system memory as a unified memory. From the MMD 100 perspective, the two memories are logically equivalent and any data structure may be allocated in either memory. Therefore, under the master/master model, the standard shared memory usage model allows for multiple clients and the traffic on the MLINK 160 may be short, random accesses.

In one embodiment, the MLINK master/master interface specification requires a physical-to-physical address remapping mechanism which insures that the MMD 100 will have a contiguous view of data structures dynamically allocated in the system memory. One embodiment for providing the contiguous view is the utilization of a media translation table which is separate from a CPU management unit and is under driver control. In one embodiment, the media translation table may be implemented on the system memory or on the multimedia device 100, wherein the multimedia device memory space is typically non-cacheable. The system memory space dedicated for MLINK is preferably non-cacheable also, but as recognized by one having ordinary skill in the art, the memory may be any suitable type of memory location. Furthermore, the memory management unit allows for the translation between a CPU virtual address and a physical address and the media translation table allows for the translation between a MMD 100 linear address and a corresponding physical address.

FIG. 14 illustrates a graphical representation of the data 320 for programming the table 300 of FIG. 13. The operational code 322 is "10" and the client identifier 324 is the client identifier to be programmed into the table 300. Bytes 0-4, 326-334 are the data for the lookup table entry. In one embodiment, byte 0 is bit 7-0 in the lookup table 300, byte 1 is bit 15-18, byte 2 is bit 16-23, byte 3 332 are bits 24-32 and byte 4 334 includes bits 33-34. As the type_one lookup table 300 is 34 bits wide, the six most significant bits of byte 4 334 are discarded. The inclusion of five bytes 326-334 after the operational code 322 illustrates one exemplary embodiment. It is recognized that any other implementation of having bytes disposed with an associated type_one data packet may be utilized to accomplish the programming of the associated lookup table 300.

As such, the present invention provides for a multimedia display in a mobile device wherein the mobile device has reduced processing and bandwidth abilities. By utilizing an efficient protocol requests and response data packet system, the amount of data transferred across the bus 160 of FIG. 3 is thereby reduced and overhead processing requirements are reduced through utilizing more efficient data transfer packets. As such, in a limited space with limited processing and bandwidth resources, the present invention allows for multimedia display within the mobile device 150.

It should be understood that the implementation of other variations and modifications of the invention in its various aspects will be apparent to those of ordinary skill in the art, and that the invention is not limited by the specific embodiments described herein. For example, operational codes may be any suitable combination of codes allowing for the direction of the instruction for utilizing the associated data packet. It is therefore contemplated to cover by the present invention, any and all modifications, variations, or prevalence that fall within the spirit and scope of the basic underlying principles disclosed and claimed herein.

What is claimed is:

1. A method for multimedia display in a mobile device comprising:
   receiving an encoded multimedia display command encoded within a multimedia link interface protocol, the encoded multimedia display commands including a command type code indicating whether the encoded multimedia display command employs an address index and an operation code;
   decoding the encoded multimedia display command to generate a multimedia display command by retrieving the multimedia display command as referenced by the command type code and the operation code; and
   executing the multimedia display command.

2. The method of claim 1 wherein the command type code is utilized to determine if the encoded multimedia display command is at least one of the following: a type_zero command and a type_one command.

3. The method of claim 2 wherein the operation code is utilized to determine if the encoded multimedia display command is at least one of the following: a read command, a write command, a response command and a reset command.

4. The method of claim 3 wherein when the encoded multimedia display command is the type_zero command, the encoded multimedia command further includes a byte_length data packet and a byte_address data packet.

5. The method of claim 3 wherein when the encoded multimedia display command is the type_one command, the encoded multimedia command further includes a client identifier, the method further comprising:
accessing a lookup table comprising a plurality of accessed addresses using the client identifier as an index.

6. The method of claim 3 wherein the type_one command has a smaller bit length than the type_zero command.

7. The method of claim 1 wherein the encoded multimedia display command is received from a central processing unit across a bi-directional bus.

8. The method of claim 1 wherein the command type code is a single bit data value and the operation code is a double bit data value.

9. The method of claim 1 further comprising:
generating a multimedia output display; and
providing the multimedia output display to a display device.

10. An apparatus for multimedia display in a mobile device comprising:
a multimedia processor capable of generating a multimedia display output;
a multimedia display buffer coupled to the multimedia processor;
a camera interface coupled to the multimedia processor such that the processor is capable of receiving a captured image from a camera; and
a multimedia link interface capable of receiving an encoded multimedia display command encoded in a multimedia link interface command protocol and generating therefrom a multimedia display command capable of being performed by the multimedia processor such that the multimedia processor can generate the multimedia display output and provide the multimedia display output to a display device.

11. The apparatus of claim 10 wherein the encoded multimedia display command includes a command type code and an operation code such that the command type code is at least one of following: a type_zero command and a type_command and the operation code is at least one of the following: a read command, a write command, a response command and a reset command.

12. The apparatus of claim 11 wherein when the encoded multimedia display command is the type_zero command, the encoded multimedia command further includes a byte_length data packet and a byte_address data packet and when the encoded multimedia display command is the type_one command, the encoded multimedia command further includes a client identifier.

13. The apparatus of claim 12 further comprising:
a lookup table operably coupled to the multimedia link interface such that the multimedia link interface may access the lookup table using the client identifier.

14. The apparatus of claim 10 wherein the multimedia link interface is operably coupleable to a central processing unit across a bus such that the encoded multimedia display command is received from the central processing unit and across the bi-directional bus.

15. The apparatus of claim 10 wherein the multimedia link interface operates in at least one of: a master/slave mode and a master/master mode.

16. A mobile device comprising:
a central processing unit capable of generating an encoded multimedia display command;
a camera capable of acquiring a captured image
a multimedia processing device operably coupled to the camera and to the central processing unit across a bi-directional bus, the multimedia processing device including:
a multimedia processor capable of generating a multimedia display output;
a multimedia display buffer coupled to the multimedia processor;
a camera interface coupled to the multimedia processor such that the processor is capable of receiving the captured image from the camera; and
a multimedia link interface capable of receiving the encoded multimedia display command from the central processing unit, wherein the encoded multimedia display command is encoded in a multimedia device link command protocol such that the multimedia processor decodes and executes the encoded multimedia display command; and
an output device operably coupled to the multimedia processing device such that the output device receives a multimedia display output from the multimedia processing device for display thereupon.

17. The mobile device of claim 16 further comprising:
a baseband receiver operably coupled to the central processor for receiving and transmitting mobile communications thereacross.

18. The mobile device of claim 16 wherein the encoded multimedia display command includes a command type code and an operation code such that the command type code is at least one of following: a type_zero command and a type_command and the operation code is at least one of the following: a read command, a write command, a response command and a reset command.

19. The mobile device of claim 18 wherein when the encoded multimedia display command is the type_zero command, the encoded multimedia command further includes a byte_length data packet and a byte_address data packet and when the encoded multimedia display command is the type_one command, the encoded multimedia command further includes a client identifier.

20. The mobile device of claim 19 further comprising:
a lookup table operably coupled to the multimedia link interface such that the multimedia link interface may access the lookup table using the client identifier.

21. The mobile device of claim 16 wherein the display device includes a bitmap memory such that the multimedia processor can provide the multimedia display output to the display device at a display rate capable of producing a flicker free display.

22. The mobile device of claim 16 wherein the central processing unit includes a multimedia display command encoder such that the central processing unit may encode the encoded multimedia command in accordance with the multimedia device interface command protocol.

23. The mobile device of claim 16 wherein the multimedia link interface operates in at least one of: a master/slave mode and a master/master mode.

24. A method for multimedia display interfacing in a mobile device comprising:
receiving an encoded multimedia display command encoded within a multimedia link interface protocol, the encoded multimedia display command including a command type code and an operation code, wherein the command type code is utilized to determine if the encoded multimedia display command is at least one of the following: a type_zero command and a type_one command and the operation code is utilized to determine if the encoded multimedia display command is at least one of the following: a read command, a write command, a response command and a reset command;

decoding the encoded multimedia display command to generate a multimedia display command, as referenced by the command type code and the operation code, wherein when the encoded multimedia display command is the type_zero command, the encoded multimedia command further includes a byte_length data packet and a byte_address data packet and when the encoded multimedia display command is the type_one command, the encoded multimedia command further includes a client identifier;

accessing a lookup table comprising a plurality of accessed addresses using the client identifier as an index; and executing the multimedia display command.

25. The method of claim 24 wherein the type_one command has a smaller bit length than the type_zero command.

26. The method of claim 24 wherein the encoded multimedia display command is received from a central processing unit across a bus.

27. The method of claim 24 wherein the command type code is a single bit data value and the operation code is a double bit data value.

28. The method of claim 24 further comprising:
generating a multimedia output display; and
providing the multimedia output display to a display device.

* * * * *